(12) United States Patent
Kitawaki et al.

(10) Patent No.: US 7,121,202 B2
(45) Date of Patent: Oct. 17, 2006

(54) IMAGING APPARATUS AND IMAGING METHOD TO INCREASE EFFICIENCY OF MOUNTING/DEMOUNTING OF A RECORDING MATERIAL TO/FROM A RECORDING DRUM

(75) Inventors: Shiro Kitawaki, Kyoto (JP); Susumu Takahashi, Kyoto (JP)

(73) Assignee: Dainippon Screen Mfg. Co., Ltd., Kyoto (JP)

( * ) Notice: Subject to any disclaimer, the term of this patent is extended or adjusted under 35 U.S.C. 154(b) by 386 days.

(21) Appl. No.: 10/769,981

(22) Filed: Feb. 3, 2004

(65) Prior Publication Data

US 2004/0227912 A1 Nov. 18, 2004

(30) Foreign Application Priority Data

Feb. 3, 2003 (JP) .............................. 2003-025950
Dec. 5, 2003 (JP) .............................. 2003-407005

(51) Int. Cl.
*B41F 1/28* (2006.01)
*B41L 3/02* (2006.01)
*B41J 2/435* (2006.01)

(52) U.S. Cl. ................ 101/407.1; 101/486; 101/415.1; 347/263

(58) Field of Classification Search ................ 347/263; 101/415.1, 409
See application file for complete search history.

(56) References Cited

U.S. PATENT DOCUMENTS

| 5,794,530 | A | * | 8/1998 | Dobashi et al. | ............. 101/409 |
| 6,164,204 | A | * | 12/2000 | Kawada et al. | .......... 101/415.1 |
| 6,213,020 | B1 | | 4/2001 | Kawada et al. | |
| 6,334,392 | B1 | | 1/2002 | Kawada et al. | |

FOREIGN PATENT DOCUMENTS

JP 7-39175 5/1995
JP 2000-112142 A 4/2000

\* cited by examiner

*Primary Examiner*—Hai Pham
*Assistant Examiner*—Carlos A. Martinez
(74) *Attorney, Agent, or Firm*—McDermott Will & Emery LLP

(57) ABSTRACT

A plate is consecutively mounted on the outer peripheral surface of a recording drum under pressure from a squeegee roller, with its leading edge clamped by leading edge clamps. Guide members for causing the squeegee roller to climb up thereon are provided on the outer peripheral surface of the recording drum such that the squeegee roller is prevented from interfering with the leading edge clamps during plate mounting. Without the need to stop the rotation of the recording drum during plate mounting, a time period required for plate mounting can be reduced.

12 Claims, 23 Drawing Sheets

F I G. 1
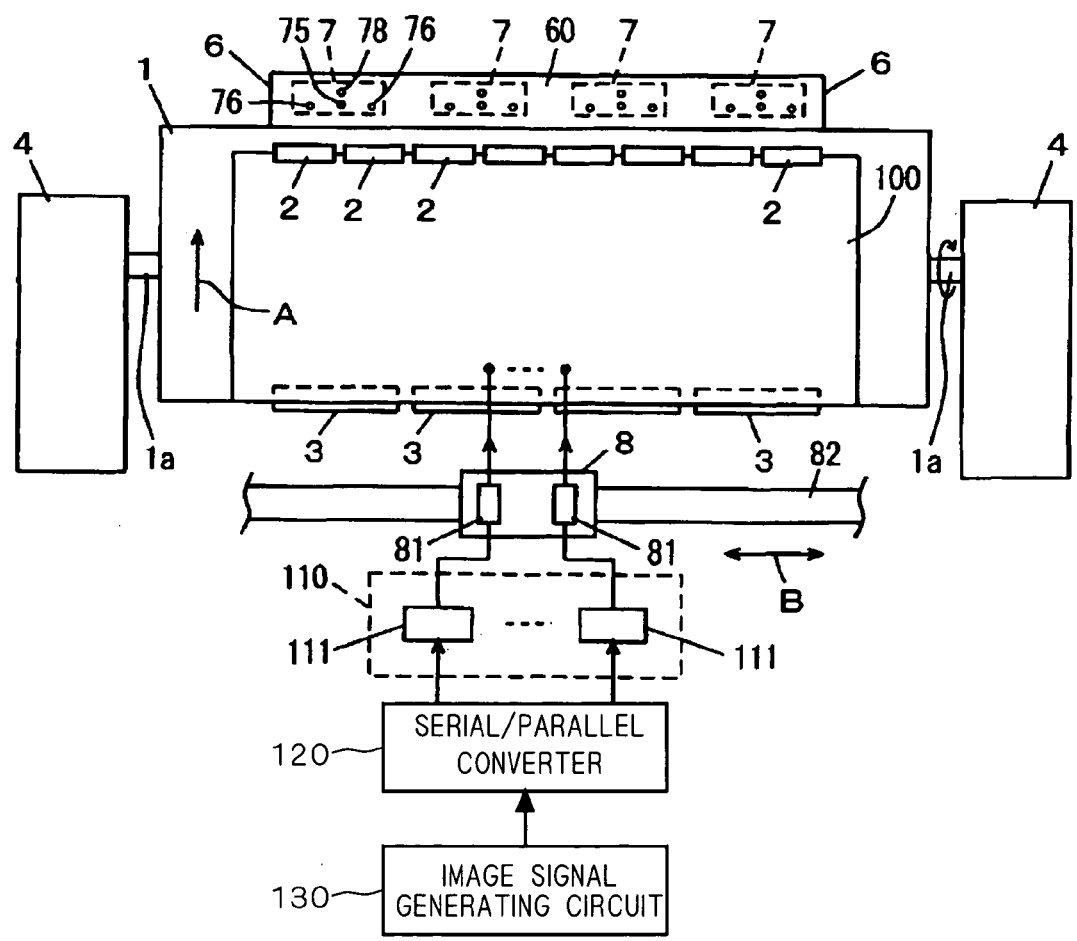

ROTATE DRUM UNTIL LEADING EDGE CLAMP FACES RELEASE PIN
APPLY BRAKE TO DRUM
RELEASE LEADING EDGE CLAMP
MOVE SQUEEGEE ROLLER DOWNWARD

SUPPLY PLATE

FASTEN LEADING EDGE CLAMP

RELEASE BRAKE APPLIED TO DRUM
ROTATE DRUM UNTIL LEADING EDGE CLAMP FACES SQUEEGEE ROLLER
SQUEEGEE ROLLER CLIMBS UP ON GUIDE MEMBER
APPLY BRAKE TO DRUM

FASTEN TRAILING EDGE CLAMP

MOVE SQUEEGEE ROLLER UPWARD

ROTATE DRUM UNTIL TRAILING EDGE CLAMP REACHES POSITION WHERE IT SHOULD BE RELEASED
APPLY BRAKE TO DRUM

MOVE SQUEEGEE ROLLER DOWNWARD

RELEASE TRAILING EDGE CLAMP

RELEASE BRAKE APPLIED TO DRUM
ROTATE DRUM UNTIL LEADING EDGE CLAMP FACES RELEASE PIN
SQUEEGEE ROLLER CLIMBS UP ON GUIDE MEMBER
APPLY BRAKE TO DRUM

RELEASE LEADING EDGE CLAMP

DISCHARGE PLATE

ROTATE DRUM UNTIL LEADING EDGE CLAMP FACES RELEASE PIN
APPLY BRAKE TO DRUM
RELEASE LEADING EDGE CLAMP

SUPPLY PLATE

FASTEN LEADING EDGE CLAMP

RELEASE BRAKE APPLIED TO DRUM
ROTATE DRUM UNTIL LEADING EDGE CLAMP PASSES BY SQUEEGEE ROLLER

MOVE SQUEEGEE ROLLER DOWNWARD

ROTATE DRUM UNTIL TRAILING EDGE CLAMP REACHES POSITION WHERE IT SHOULD BE FASTENED
APPLY BRAKE TO DRUM

FASTEN TRAILING EDGE CLAMP

MOVE SQUEEGEE ROLLER UPWARD

ROTATE DRUM UNTIL TRAILING EDGE CLAMP REACHES POSITION WHERE IT SHOULD BE RELEASED
APPLY BRAKE TO DRUM

MOVE SQUEEGEE ROLLER DOWNWARD

RELEASE TRAILING EDGE CLAMP

RELEASE BRAKE APPLIED TO DRUM
ROTATE DRUM UNTIL LEADING EDGE CLAMP COMES CLOSE TO SQUEEGEE ROLLER

MOVE SQUEEGEE ROLLER UPWARD

ROTATE DRUM UNTIL LEADING EDGE CLAMP FACES RELEASE PIN
APPLY BRAKE TO DRUM

RELEASE LEADING EDGE CLAMP

DISCHARGE PLATE

IMAGING APPARATUS AND IMAGING METHOD TO INCREASE EFFICIENCY OF MOUNTING/DEMOUNTING OF A RECORDING MATERIAL TO/FROM A RECORDING DRUM

BACKGROUND OF THE INVENTION

1. Field of the Invention

The present invention relates to an imaging apparatus for mounting a sheet-like recording material on the outer peripheral surface of a drum to record images on the recording material.

2. Description of the Background Art

Imaging apparatuses have been used for recording images on various types of recording materials with irradiation of laser light. In a drum-type imaging apparatus, a recording material is mounted on a recording drum rotatable in a main scanning direction, and a recording head having a laser diode and the like moves in a subscanning direction parallel to a rotary shaft of the recording drum to record images on the recording material.

In such drum-type imaging apparatus, the leading and trailing edges of the recording material are clamped by clamps under pressure, so that the recording material is mounted around the drum.

Further, in such apparatus, the recording material is mounted on the drum and demounted from the drum under pressure from a squeegee roller.

In such conventional apparatus, a recording drum is rotated with the leading edge of a recording material clamped by clamps such that the recording material is consecutively mounted on the recording drum. At this time, a problem arises in that the clamps clamping the leading edge of the recording material interfere with a squeegee roller. To prevent this problem, the recording drum is temporarily stopped rotating at the mounting of the recording material on the drum, following which the squeegee roller is retracted to such a position that it does not interfere with the clamps, and thereafter, rotation of the recording drum is started again. However, another problem arises in that such operation increases the time period required for mounting the recording material. A similar problem also arises when the recording material is demounted from the recording drum.

SUMMARY OF THE INVENTION

The present invention is intended for an imaging apparatus.

According to the present invention, the imaging apparatus comprises: a recording drum rotating about a rotary axis thereof in a predetermined direction with a sheet-like recording material mounted thereon; a roller relatively moving with respect to an outer peripheral surface of the recording drum on the outer peripheral surface, thereby pressing the recording material against the outer peripheral surface; a driving element for moving the roller close to and away from the recording drum; a recording head for irradiating laser beam onto the recording material mounted on the recording drum to record a predetermined image onto the recording material; and a guide member provided in the vicinity of a structure provided on the outer peripheral surface of the recording drum for causing the roller to climb up thereon, thereby changing a traveling path of the roller such that the roller avoids interference with the structure.

The roller can be moved on the outer peripheral surface of the recording drum without making a stop, irrespective of a structure, if any, formed on the outer peripheral surface. Further, while moving, the roller does not need to be moved by the driving element away from the recording drum in order to avoid interference with the structure. This can reduce time periods required for mounting and demounting the recording material, achieving improved operating efficiency.

Preferably, the structure is a clamp member for clamping one edge of the recording material to the outer peripheral surface of the recording drum.

In the case where the recording material is clamped by the clamp member, the roller does not need to be moved by the driving element away from the recording drum in order to avoid interference with the clamp member.

More preferably, the roller is held slidably on the driving element in directions close to and away from the outer peripheral surface of the recording drum, and the driving element includes an urging element for urging the roller toward the outer peripheral surface of the recording drum.

Change of the traveling path of the roller can be made smoothly by the guide member.

More preferably, the guide member includes: a first inclined surface for causing the roller to climb up thereon away from the outer peripheral surface of the recording drum; a passage surface for causing the roller to pass over the clamp member; and a second inclined surface for causing the roller to move thereon close to the outer peripheral surface of the recording drum.

The roller can be moved smoothly.

More preferably, the guide member is a pair of guide members respectively provided on opposite sides of the clamp member along the rotary axis of the recording drum, and a length of the roller along the rotary axis is equal to or greater than a space between the pair of guide members.

The roller can climb up on the pair of guide members at the same time, and thus can be moved more smoothly.

More preferably, the passage surface is of a height above the outer peripheral surface of the recording drum greater than a height of the clamp member.

The roller can be moved more smoothly without interfering with the clamp member.

More preferably, the roller rotates following the rotation of the recording drum.

Usually, little friction arises between the roller surface and recording drum surface. This can prevent damage to the respective surfaces of the roller, recording drum and recording material. In the case where the revolution per minute and direction of rotation of the recording drum are changed, the roller can be rotated in accordance with such changes without producing friction. Further, forming the first and second inclined surfaces of each of the guide members in a predetermined shape can prevent the occurrence of friction when the roller passes over the clamp member.

More preferably, the recording drum is rotatable in the reverse direction of the predetermined direction, and when the recording drum rotates in the reverse direction, the second inclined surface functions as an inclined surface for causing the roller to climb up thereon away from the outer peripheral surface of the recording drum, and the first inclined surface functions as an inclined surface for causing the roller to move thereon close to the outer peripheral surface of the recording drum.

When the recording drum rotates in the reverse direction, the roller can also be moved on the outer peripheral surface of the recording drum without making a stop. Further, since the recording material can be supplied and discharged to and from the recording drum at the same position, the supply path and discharge path for the recording material can be arranged vertically with each other above the recording drum.

According to another aspect of the present invention, an imaging apparatus is for exposing a recording material to light, and comprises: a recording drum having a cylindrical outer peripheral surface on which the recording material is mounted and rotating about a rotary axis thereof; a transport mechanism for transporting the recording material to the recording drum; a leading edge clamp having a clamp body urged to be fastened; a releasing mechanism for pressing the leading edge clamp to release the clamp body; a roller provided downstream from the releasing mechanism in a direction of rotation of the recording drum, relatively moving with respect to the outer peripheral surface of the recording drum on the outer peripheral surface; and a guide member provided in the vicinity of the leading edge clamp for causing the roller to climb up thereon to change a traveling path of the roller such that the roller avoids interference with the leading edge clamp. When mounting the recording material on the outer peripheral surface of the recording drum, the recording drum is rotated until the leading edge clamp faces the transport mechanism, the releasing mechanism releases the clamp body of the leading edge clamp, the transport mechanism transports the recording material toward the recording drum, and the recording drum is rotated without making a stop with the recording material pressed by the roller, after a leading edge of the recording material is clamped by the clamp body and until the recording material reaches the outer peripheral surface throughout substantially full length thereof.

In the process of consecutively mounting the recording material being pressed by the roller on the recording material, it is not necessary to stop the rotation of the drum such that the roller moves away from the recording drum in order to avoid intereference with the leading edge clamp.

According to still another aspect of the present invention, an imaging apparatus is for exposing a recording material to light, and comprises: a recording drum having a cylindrical outer peripheral surface on which the recording material is mounted and rotating about a rotary axis thereof in a predetermined direction of rotation; a transport path for transporting the recording material from the recording drum; a leading edge clamp for clamping one edge of the recording material located upstream in the predetermined direction of rotation to the outer peripheral surface of the recording drum; a trailing edge clamp for clamping the other edge of the recording material to the outer peripheral surface of the recording drum; a disengaging element for disengaging the trailing edge clamp from the recording drum; a roller provided upstream from the disengaging element in the predetermined direction of rotation, relatively moving with respect to the outer peripheral surface of the recording drum on the outer peripheral surface; a guide member provided in the vicinity of the leading edge clamp for causing the roller to climb up thereon to change a traveling path of the roller such that the roller avoids interference with the leading edge clamp. When demounting the recording material from the outer peripheral surface of the recording drum, the recording drum is rotated until the trailing edge clamp faces the disengaging element, the disengaging element disengages the trailing edge clamp from the recording drum, and the recording drum is rotated with the recording material pressed by the roller to cause the recording material to be discharged to the transport path.

In the process of consecutively demounting the recording material being pressed by the roller on the recording material, it is not necessary to stop the rotation of the drum such that the roller moves away from the recording drum in order to avoid interference with the trailing edge clamp.

The present invention is also intended for an imaging method.

It is therefore an object of the present invention to increase the efficiency in mounting/demounting of a recording material on/from a recording drum in a drum-type imaging apparatus to thereby improve the operating efficiency of the imaging apparatus.

These and other objects, features, aspects and advantages of the present invention will become more apparent from the following detailed description of the present invention when taken in conjunction with the accompanying drawings.

BRIEF DESCRIPTION OF THE DRAWINGS

FIG. 1 is a schematic plan view of an imaging apparatus according to a preferred embodiment of the present invention;

DESCRIPTION OF THE PREFERRED EMBODIMENTS

Figure 2:
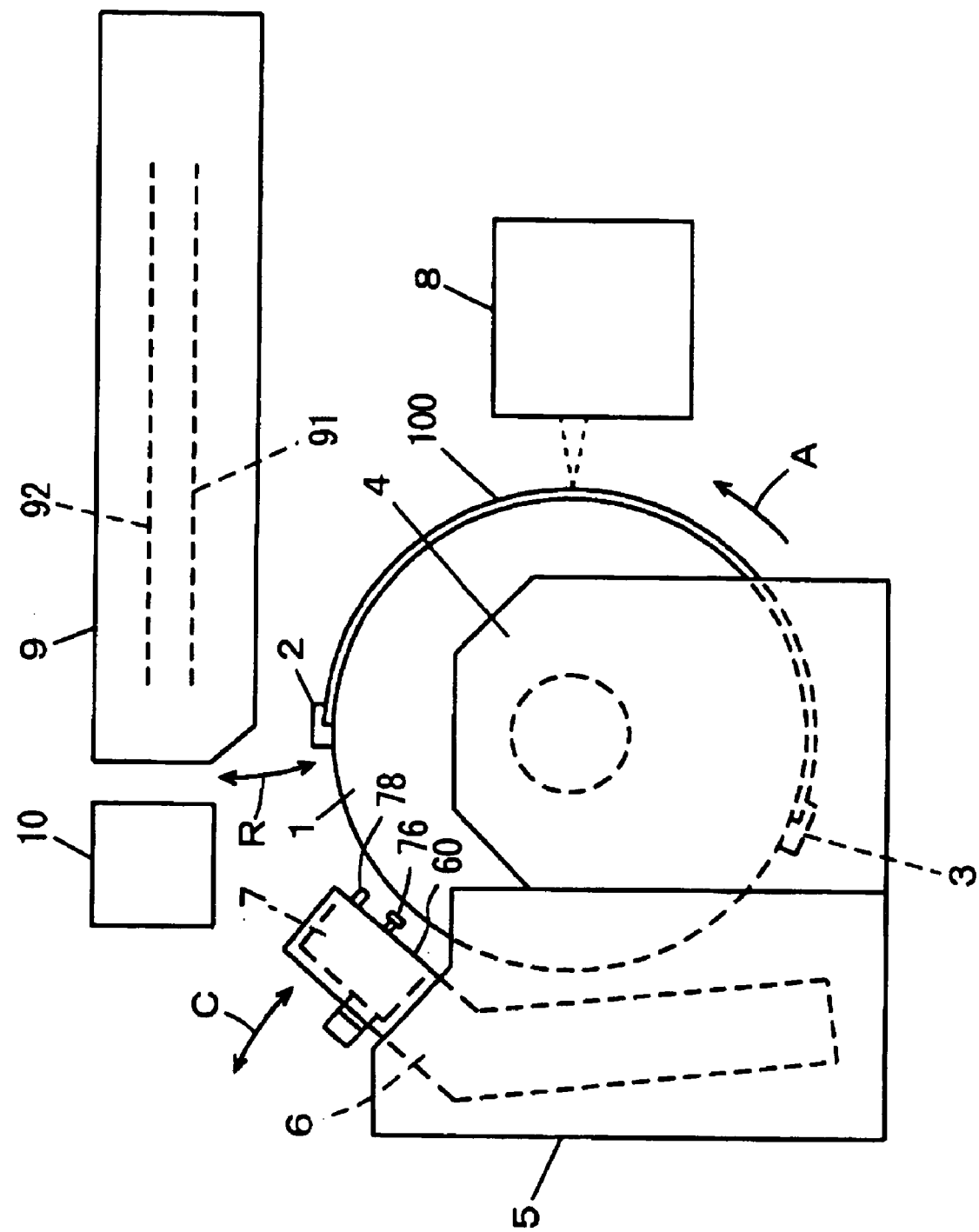
FIG. 2 is a schematic side view of the imaging apparatus shown in FIG. 1.

FIG. 1 is a schematic plan view of an imaging apparatus to which the present invention is applied, and FIG. 2 is a schematic side view of the imaging apparatus shown in FIG. 1.

In FIGS. 1 and 2, the imaging apparatus comprises a cylindrical recording drum 1. The recording drum 1 is rotated about a rotary shaft 1a by a rotation driving device 4 along an arrow A (hereinafter referred to as a main scanning direction or a positive direction A). A plate 100 made of aluminum is mounted on the outer peripheral surface of the recording drum 1 as a recording material. The plate 100 has its one edge clamped to the outer peripheral surface of the recording drum 1 by a plurality of leading edge clamps 2 and the other edge clamped to the outer peripheral surface of the recording drum 1 by a plurality of trailing edge clamps 3. To assist in clamping the plate 100 by the leading edge clamps 2 and trailing edge clamps 3, many suction holes and suction grooves may be formed in the recording drum 1 to bring the plate 100 in tight contact with the surface of the recording drum 1 by suction.

The rotation driving device 4 may also be rotated in the reverse direction of the main scanning direction (hereinafter referred to as a reverse direction −A). The rotation driving device 4 includes a brake mechanism not shown, which thus can stop the rotation of the recording drum 1 in plate mounting and demounting operations which will be described later.

A recording head 8 comprising a plurality of laser diodes 81 is provided ahead of the recording drum 1. The recording head 8 is movably attached to a guide 82, and moves along an arrow B (hereinafter referred to as a subscanning direction) in synchronization with the rotation of the recording drum 1.

The plurality of laser diodes 81 of the recording head 8 are driven by a laser diode driving circuit portion 110. The laser diode driving circuit portion 110 includes a plurality of laser diode driving circuits 111 corresponding to the plurality of laser diodes 81, respectively.

An image signal generating circuit 130 generates a serial image signal. A serial/parallel converter 120 converts the serial image signal generated by the image signal generating circuit 130 into parallel image signals, and feeds the parallel image signals, respectively, to the plurality of laser diode driving circuits 111 in the laser diode driving circuit portion 110. Accordingly, the laser diodes 81 in the recording head 8 are respectively driven by the corresponding laser diode driving circuits 111 to irradiate laser light onto the plate 100.

As shown in FIG. 2, a clamp driving device 5 is provided behind the recording drum 1. The clamp driving device 5 is used for fastening/releasing the trailing edge clamps 3 to/from the recording drum 1, releasing the leading edge clamps 2 on the recording drum 1 and moving a squeegee roller 55 close to or away from the recording drum 1.

The clamp driving device 5 comprises a pair of clamp arms 6 swingable along arrows C. A driving bar 60 is attached between the pair of clamp arms 6, and a plurality of driving devices 7 are attached to the driving bar 60. As shown in FIG. 1, the driving devices 7 are each provided with a driving pin 75, two holding pins 76 and a release pin 78. The driving pin 75 controls engaged portions of the trailing edge clamps 3 for fastening/releasing the trailing edge clamps 3 to/from the outer peripheral surface of the recording drum 1. The holding pins 76 are for holding the trailing edge clamps 3 when released from the recording drum 1. The release pin 78 is for pressing a side part of each of the leading edge clamps 2 (which will be described later) for releasing the leading edge clamps 2.

Further, as shown in FIG. 2, a transport unit 9 is provided above the recording drum 1 so as to be swingable along arrows R. The transport unit 9 has a first transport path 91 for loading plates and a second transport path 92 for unloading plates. At mounting, the plate 100 is fed onto the recording drum 1 along the first transport path 91 of the transport unit 9. The plate 100 demounted from the recording drum 1 is transported to the outside along the second transport path 92 of the transport unit 9. In the present embodiment, the first transport path 91 provided below is for loading plates and the second transport path 92 provided above is for unloading plates, however, the lower transport path may be used for unloading plates and the upper transport path may be used for loading plates.

A punching device 10 for making positioning holes and the like in the plate 100 is provided near the leading edge of the transport unit 9. The plate 100 is supplied to the punching device 10 along the first transport path 91 of the transport unit 9 prior to being supplied onto the recording drum 1, so that the positioning holes are made on the edges of the plate 100. The positioning holes in the plate 100 are engaged with positioning pins (not shown) provided in the outer peripheral surface of the recording drum 1.

Figure 3:
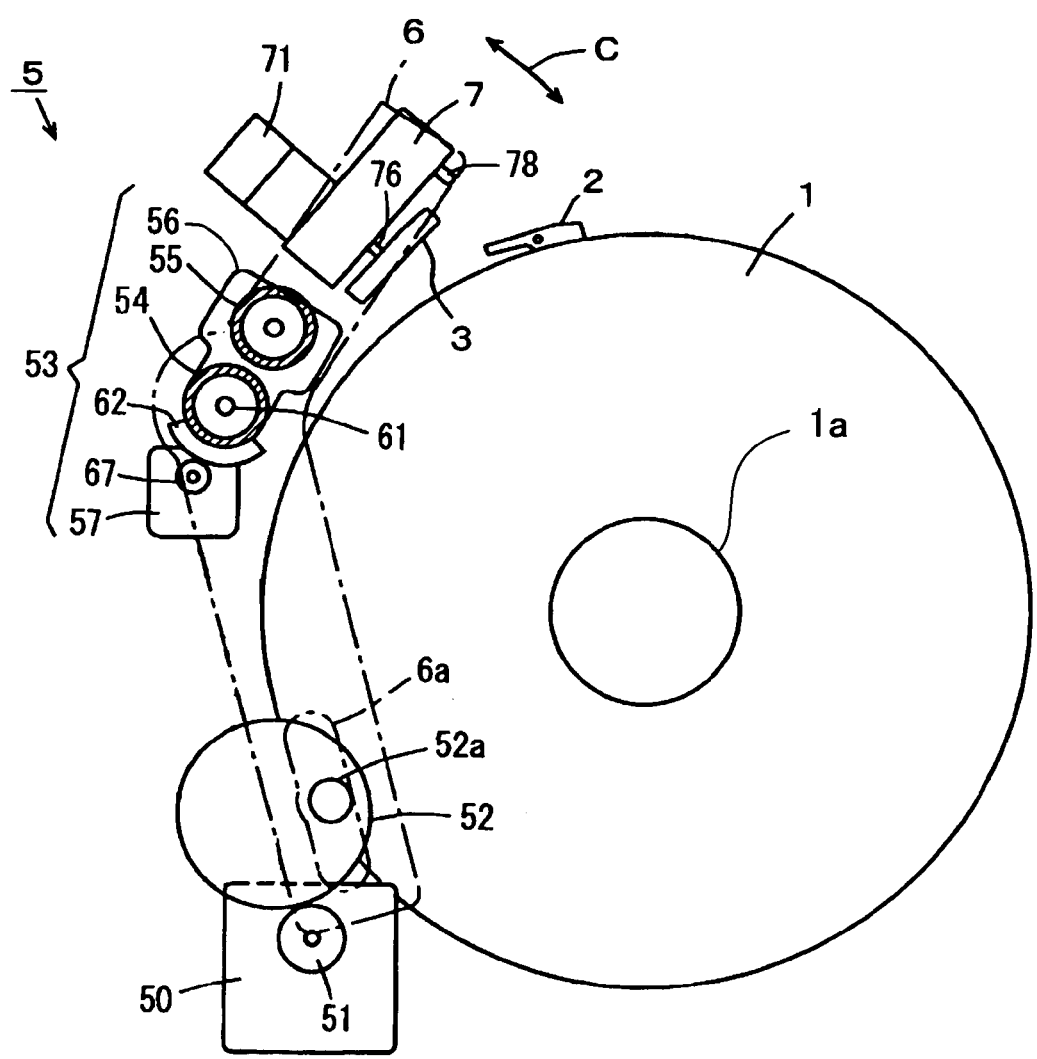
FIG. 3 is a side view of the construction of a clamp driving device in the imaging apparatus shown in FIG. 1.

FIG. 3 is a side view of the construction of the clamp driving device 5. A gear 51 is attached to a clamp arm driving motor 50. The gear 51 is in meshing engagement with a gear 52, and an engaging portion 52a provided for the gear 52 is engaged with a long hole 6a of each of the clamp arms 6. As the clamp arm driving motor 50 rotates, the pair of clamp arms 6 swing about a rotary shaft 61 along arrows C. The rotary shaft 61 is rotatably connected to a side panel not shown but provided for the imaging apparatus of the present invention.

The pair of clamp arms 6 are provided with a squeegee device 53. The squeegee device 53 is located downstream from the driving devices 7 in the direction of rotation of the recording drum 1 with the plate 100 mounted thereon. The squeegee device 53 has an adhesive roller 54, a squeegee roller 55, a pair of swing members 56 holding these rollers 54 and 55 rotatably, and a squeegee driving motor 57 for causing the pair of swing members 56 to respectively swing on the clamp arms 6.

Figure 4:
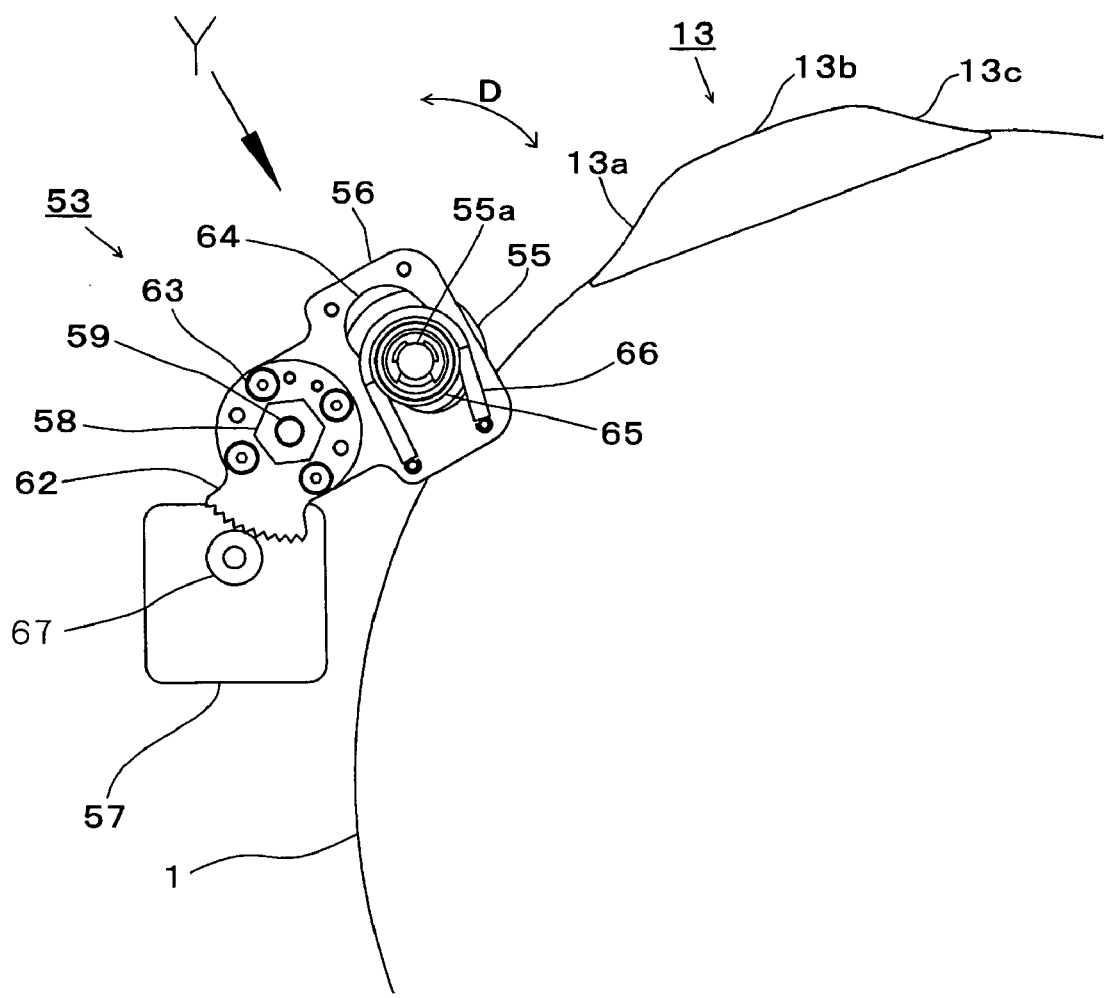
FIG. 4 is a side view of part of a recording drum in the imaging apparatus shown in FIG. 1 together with an essential part of a squeegee device.
Figure 5:
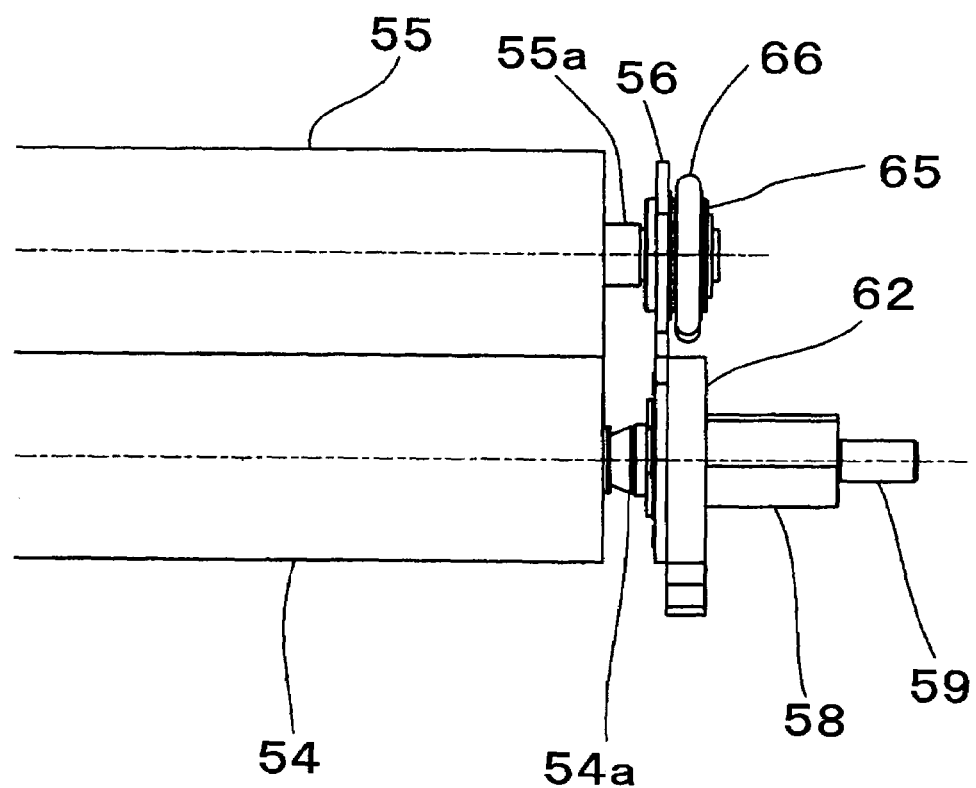
FIG. 5 is a top view of the squeegee device shown in FIG. 4 viewed along an arrow Y.

FIG. 4 is a side view of the squeegee device 53 together with part of the recording drum 1, and FIG. 5 is a top view of part of the squeegee device 53 along an arrow Y in FIG. 4.

A rotary shaft 59 is fixedly provided by screws 58 on the respective outer side faces of the swing members 56, and is held rotatably with respect to the clamp arms 6.

A gear 62 in meshing engagement with a gear 67 of the squeegee driving motor 57 is further fixedly provided by a plurality of screws 63 on the outer side face of each of the swing members 56. Each of the swing members 56 is also provided with a long hole 64 to be engaged with a bearing 65 which will be described later.

The squeegee roller 55 is a member for pressing the plate 100 against the surface of the recording drum 1 to get better contact between the plate 100 and outer peripheral surface of the recording drum 1. The opposite ends of a rotary shaft 55a of the squeegee roller 55 are each supported by the bearing 65, and the bearing 65 is held by each of the swing members 56 so as to move slidably within the long hole 64. A spring 66 with its opposite ends fixed to each of the swing members 56 is provided around the bearing 65. This spring 66 urges the squeegee roller 55 downwardly in FIG. 4 along the long hole 64.

The adhesive roller 54 has its surface made of, e.g., a silicon material, and is supported between the pair of swing members 56 to be in close contact with the surface of the squeegee roller 55. The adhesive roller 54 is for sticking dust on the surface of the squeegee roller 55 thereto, thereby cleaning the surface of the squeegee roller 55.

In the squeegee device 53 of such construction, the swing members 56 rotate about the rotary shaft 59 along arrows D in FIG. 4 when the squeegee driving motor 57 is driven.

With this rotation, the squeegee roller 55 is pressed against the surface of the recording drum 1 and moved away from the recording drum 1.

Figure 6:
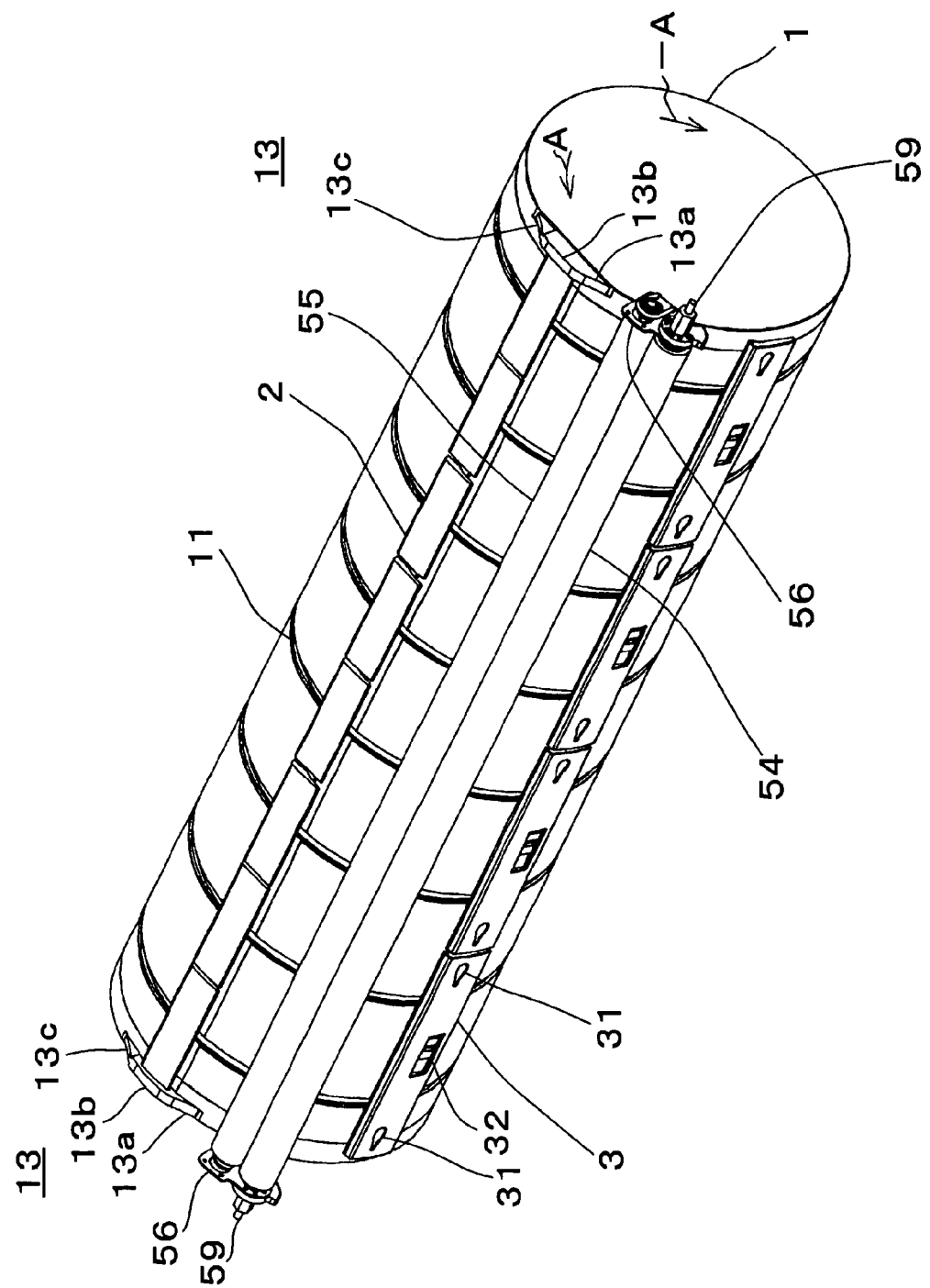
FIG. 6 is a perspective view of the recording drum in the imaging apparatus shown in FIG. 1 together with an essential part of the squeegee device.

FIG. 6 is a perspective view of the recording drum 1 together with an essential part of the squeegee device 53. As shown in FIG. 6, the recording drum 1 has a plurality of clamp grooves 11 extending in its circumferential direction formed on the outer peripheral surface thereof. The plurality of leading edge clamps 2 and the plurality of trailing edge clamps 3 are provided on the outer peripheral surface of the recording drum 1.

The plurality of leading edge clamps 2 are arranged in the axial direction of the recording drum 1 and fixed to the outer peripheral surface of the recording drum 1. The plurality of trailing edge clamps 3 are also arranged in the axial direction of the recording drum 1 and removably attached to the plurality of clamp grooves 11, respectively.

Two guide members 13 are fixedly provided on the outer peripheral surface of the recording drum 1 on the outside of the leading edge clamps 2 in the axial direction of the recording drum 1. The guide members 13 are plate-like members, each having an inclined surface 13a, a passage surface 13b and an inclined surface 13c, and are intended for momentarily separating the squeegee roller 55 moving on the outer peripheral surface of the recording drum 1 from the outer peripheral surface of the recording drum 1. The squeegee roller 55 has a length in the axial direction of the recording drum 1 substantially equal to or greater than the interval between the two guide members 13 so as to be able to climb up on the two guide members 13 at the same time.

The squeegee roller 55 relatively moves on the peripheral surface of the recording drum 1 while rotating following the rotation of the recording drum 1. While moving, the squeegee roller 55 climbs up on the guide members 13 because of the presence of the inclined surfaces 13a, and moves on the passage surfaces 13b to pass over the leading edge clamps 2. The squeegee roller 55 bypasses the leading edge clamps 2, to thereby avoid interference with the clamps 2. The angles of inclination of the inclined surfaces 13a and 13c of the guide members 13 are determined such that the squeegee roller 55 can also climb up on the guide members 13 while the recording drum 1 is rotating in the reverse direction −A (at plate demounting) as well as while the recording drum 1 is rotating in the positive direction A (at plate mounting). Specifically, when the recording drum 1 is rotating in the reverse direction −A, the inclined surface 13a functions as an inclined surface for causing the squeegee roller 55 to climb up thereon away from the outer peripheral surface of the recording drum 1, and the inclined surface 13c functions as an inclined surface for causing the squeegee roller 55 to move thereon close to the outer peripheral surface of the recording drum 1. The height of the passage surfaces 13b from the outer peripheral surface of the recording drum 1 is set to be greater than that of the leading edge clamps 2 when fastened to press the plate 100. Further, the passage surfaces 13b are each curved with a curvature substantially equal to that of the recording drum 1.

Figure 7:
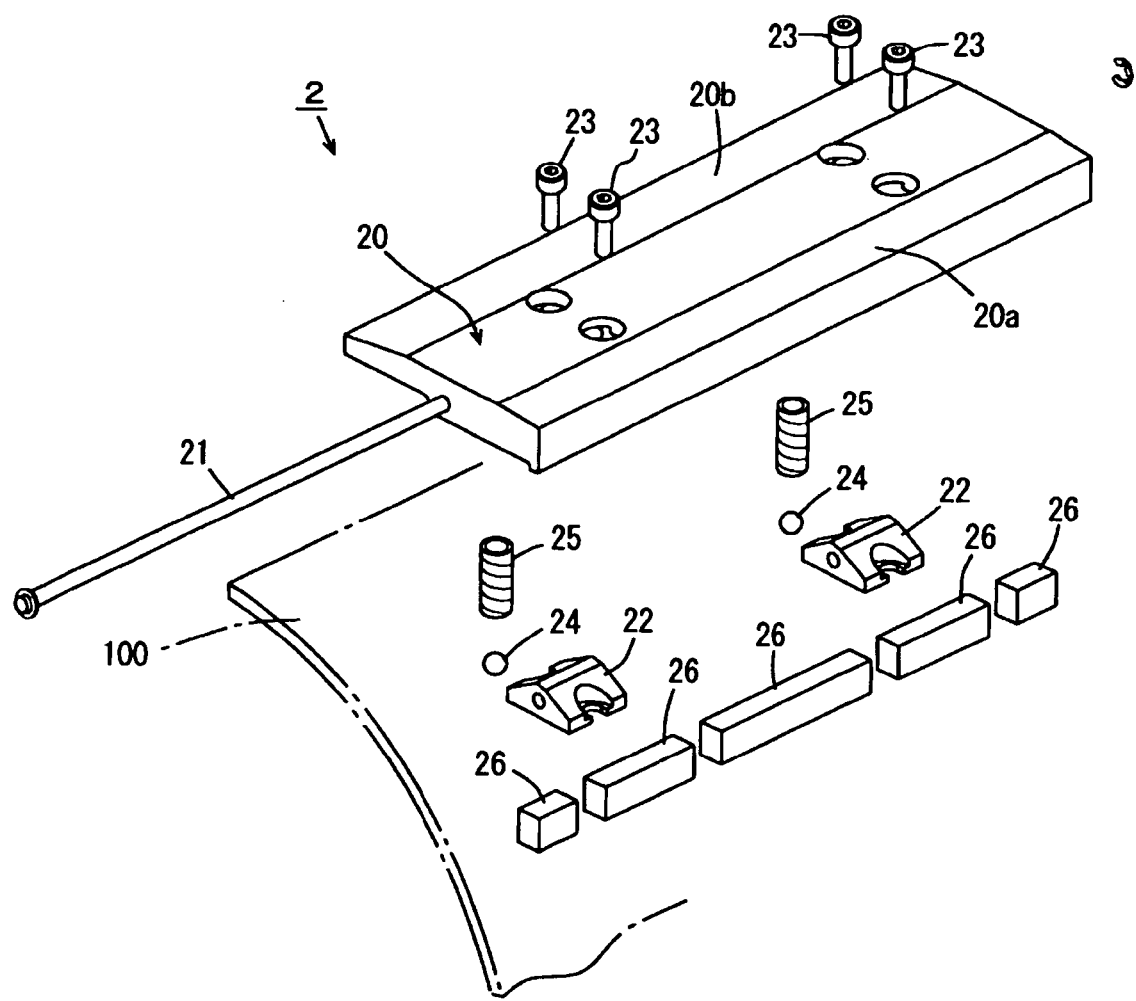
FIG. 7 is an exploded perspective view of a leading edge clamp in the imaging apparatus shown in FIG. 1.
Figure 8:
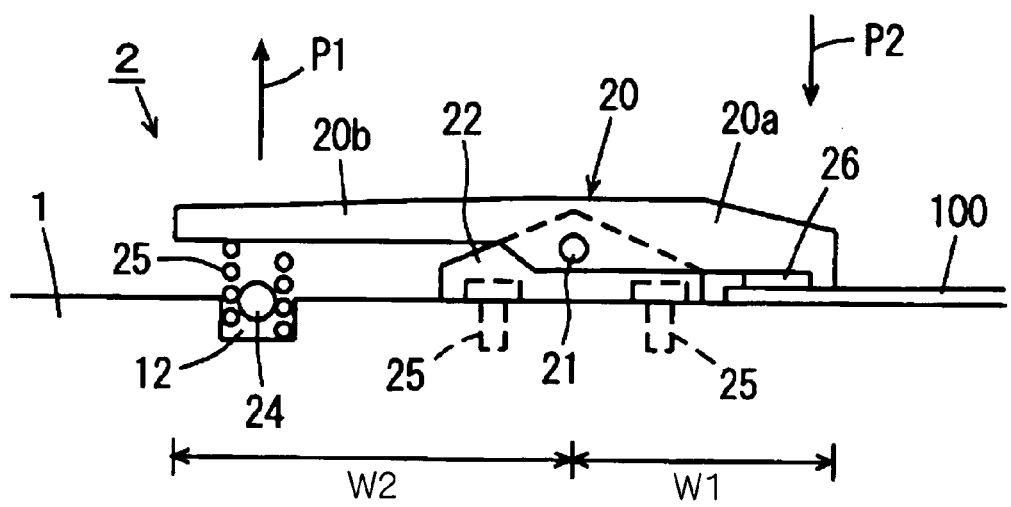
FIG. 8 is a side view of the leading edge clamp in the imaging apparatus shown in FIG. 1.

FIG. 7 is an exploded perspective view of the leading edge clamp 2, and FIG. 8 is a side view of the leading edge clamp 2. In FIGS. 7 and 8, the leading edge clamp 2 is constituted by a clamp body 20, a rotary shaft 21, two bearings 22, four bolts 23, two metal balls 24, two springs 25 and a plurality of pressing rubbers 26.

The bearings 22 are fixed to the outer peripheral surface of the recording drum 1 by the bolts 23. The clamp body 20 is rotatably attached to the bearings 22 by the rotary shaft 21. The pressing rubbers 26 are mounted on the lower surface of one side part 20a of the clamp body 20. As shown in FIG. 8, a recess 12 is formed in the recording drum 1 under the other side part 20b of the clamp body 20. The springs 25 are attached between the lower surface of the other side part 20b and recess 12 in the recording drum 1, and the metal balls 24 are inserted into the springs 25, respectively.

The lower surface of one side part 20a of the clamp body 20 may be coated with ceramic instead of attaching the pressing rubbers 26 thereto. This can improve durability without degrading friction.

A reaction force produced by the springs 25 urges the other side part 20b of the clamp body 20 to rotate about the rotary shaft 21 along an arrow P1 away from the recording drum 1. This produces a force that causes the one side part 20a of the clamp body 20 to move close to the recording drum 1 as shown by an arrow P2, so that one edge of the plate 100 on the recording drum 1 is pressed by the pressing rubbers 26.

The width W1 of the one side part 20a of the clamp body 20 relative to the rotary shaft 21 is set to be narrower than the width W2 of the other side part 20b of the clamp body 20.

At the rotation of the recording drum 1, the metal balls 24 move along the arrow P1 by a centrifugal force to push the other side part 20b of the clamp body 20 upwardly away from the recording drum 1. Further, centrifugal forces are respectively exerted upon the one side part 20a and the other side part 20b. Since the width W1 of the one side part 20a is set to be narrower than the width W2 of the other side part 20b, a rotation moment generated by the one side part 20a about the rotary shaft 21 is smaller than that generated by the other side part 20b. This exerts a force that moves the other side part 20b away from the outer peripheral surface of the recording drum 1, so that one edge of the plate 100 is firmly pressed against the outer peripheral surface of the recording drum 1 by the pressing rubbers 26 attached to the one side part 20a.

The other side part 20b in the leading edge clamp 2 is pressed by the release pin 78 of each of the driving devices 7 (see FIGS. 1 and 3). When the clamp arm driving motor 50 of the clamp driving device 5 is rotated so that the clamp arms 6 rotate about the rotary shaft 61, the release pin 78 moves close to the recording drum 1 to press the other side part 20b in the leading edge clamp 2. This allows the one side part 20a of the leading edge clamp 2 to receive the plate 100.

Referring back to FIG. 6, the trailing edge clamps 3 will be described. The trailing edge clamps 3 each have two holding holes 31 and a fitting hole 32 formed in the surface thereof. The trailing edge clamps 3 are held by the driving devices 7 with the holding pins 76 fit into the holding holes 31. Further, the trailing edge clamps 3 are each provided with engaging members (not shown) projecting downwardly from the rear surface thereof, and are mounted on the recording drum 1 with the engaging members engaged with the clamp grooves 11. For detaching the trailing edge clamps 3 from the recording drum 1, the engaging members are disengaged from the clamp grooves 11. Engaging/disengaging of the engaging members with/from the clamp grooves 11 is carried out by inserting the driving pin 75 of each of the driving devices 7 into the fitting hole 32 to operate an internal mechanism (not shown) of each of the trailing edge clamps 3 for controlling the engaging members.

The above-described construction allows the trailing edge clamps 3 to be engaged with the recording drum 1 on a plurality of positions along the rotary shaft of the recording drum 1.

FIGS. 9A to 9F are explanatory views of an operation of mounting the plate 100 on the recording drum 1. These drawings schematically illustrate the angular position of the recording drum 1 and the position of associated components at each stage. FIGS. 10A to 10F are explanatory views of an operation of demounting the plate 100 from the recording drum 1. Similarly to FIGS. 9A to 9F, these drawings schematically illustrate the angular position of the recording drum 1 and the position of associated components at each stage.

For comparison with the present embodiment, FIGS. 11A to 11H and 12A to 12H illustrate examples of plate mounting and demounting operations in the case where the guide members 13 are not provided on the outer peripheral surface of the recording drum 1. It should be noted that the illustration in FIGS. 11A to 11H and 12A to 12H is not pertinent to the present invention, detailed explanation of which is thus omitted here.

Figure 9A:
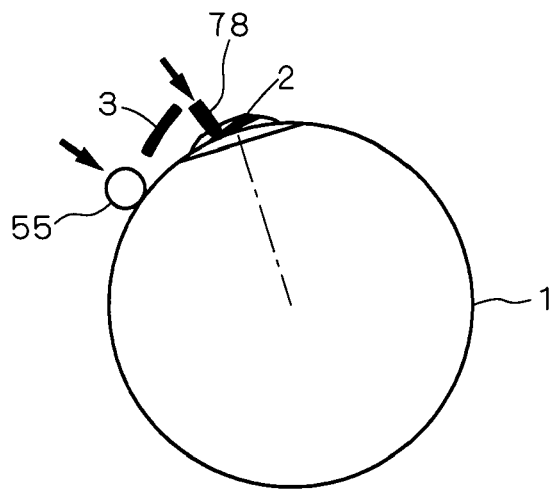
FIGS. 9A to 9F are explanatory views of a plate mounting operation in the imaging apparatus shown in FIG. 1.

Referring to FIGS. 9A to 9F, in the plate mounting operation, the recording drum 1 is first rotated by the rotation driving device 4 in the positive direction A or reverse direction −A. Accordingly, the release pin 78 of the driving device 7 faces the leading edge clamp 2 on the recording drum 1. Next, the rotation driving device 4 stops the rotation of the recording drum 1 by its brake mechanism. Next, the clamp arm driving motor 50 (see FIG. 3) rotates the clamp arms 6. This causes the release pin 78 to press the other side part 20b of the leading edge clamp 2, so that the leading edge clamp 2 is released. At the same time, the squeegee driving motor 57 (see FIG. 4) moves the squeegee roller 55 toward the recording drum 1. FIG. 9A shows this state.

Figure 9B:
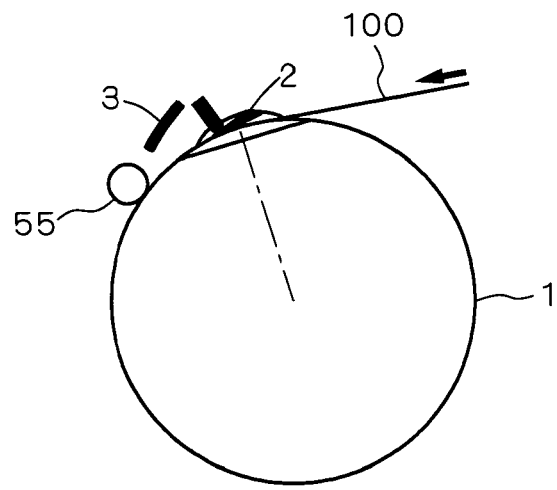

Subsequently, an unexposed plate 100 is transported toward the leading edge clamp 2 along the transport path 91 (see FIG. 2) of the transport unit 9. FIG. 9B shows the state in which the leading edge of the plate 100 transported along the transport path 91 has reached the leading edge clamp 2.

Figure 9C:
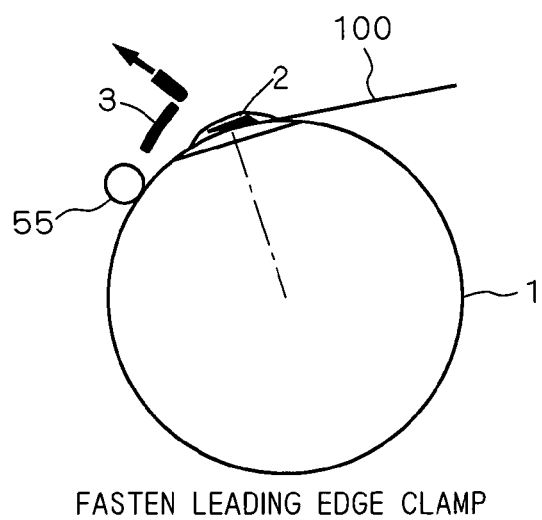

When the leading edge of the plate 100 is positioned by the positioning pins (not shown) provided on the recording drum 1, the clamp arms 6 swing, causing the release pin 78 to retract. Accordingly, the leading edge clamp 2 is fastened by the reaction force produced by the springs 25 (see FIG. 8) such that the leading edge of the plate 100 is inserted between the leading edge clamp 2 and outer peripheral surface of the recording drum 1. FIG. 9C shows the state in which the fastening of the leading edge clamp 2 is finished.

Subsequently, the recording drum 1 is rotated in the positive direction A, so that the plate 100 is consecutively mounted on the outer peripheral surface of the recording drum 1. The squeegee roller 55 is already in contact with the outer peripheral surface of the recording drum 1, and moves on the outer peripheral surface of the recording drum 1 while rotating following the rotation of the recording drum 1.

Figure 9D:
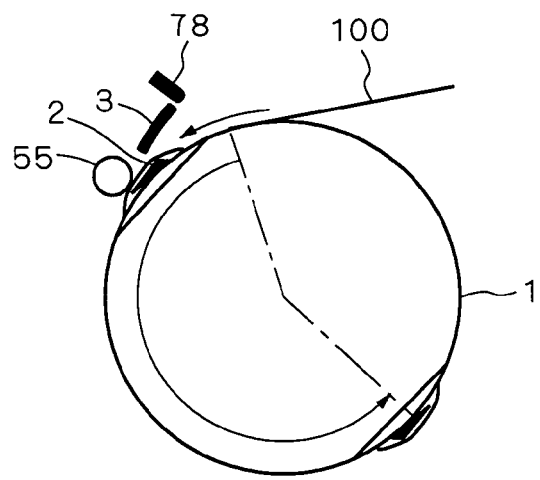

FIG. 9D shows the state in which the recording drum 1 has been rotated until the leading edge clamp 2 faces the squeegee roller 55. In the imaging apparatus of the present embodiment, the traveling path of the squeegee roller 55 can be changed because of the presence of the guide members 13 on the outer peripheral surface of the recording drum 1. Therefore, the squeegee roller 55 can move away from the recording drum 1 on the inclined surface 13a of each of the guide members 13 to pass over the leading edge clamps 2.

Figure 11A:
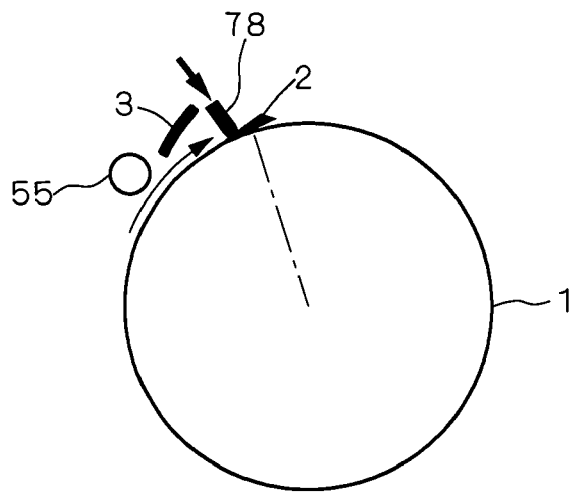
FIGS. 11A to 11H illustrate a comparative example of a plate mounting operation in the absence of guide members, for comparison with that in the preferred embodiment of the present invention.
Figure 11B:
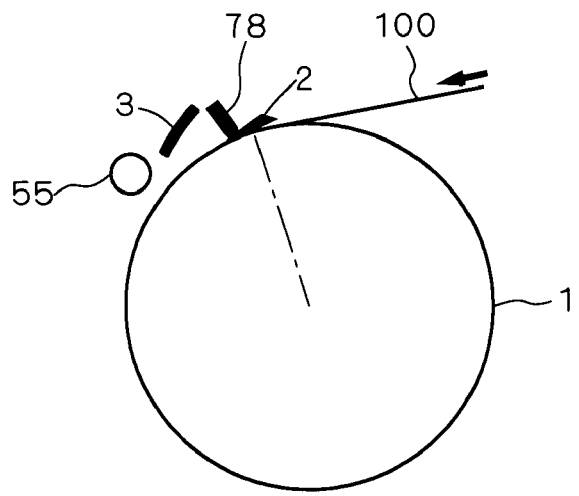
Figure 11C:
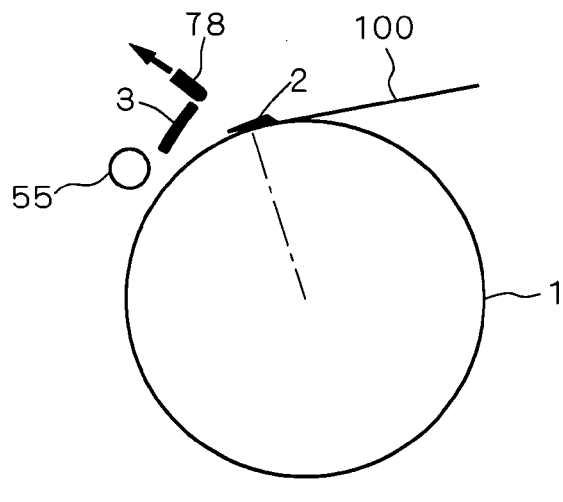
Figure 11D:
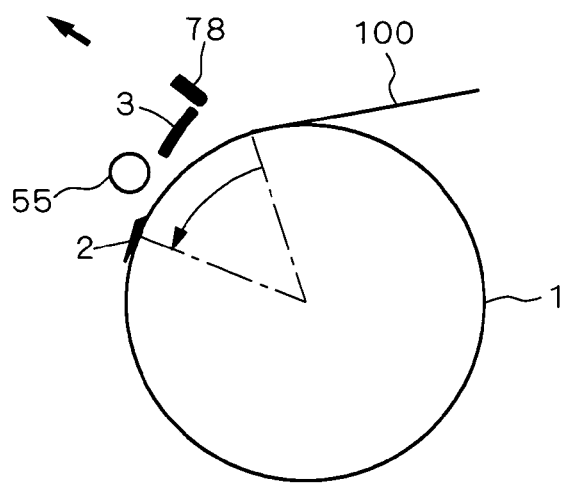
Figure 11E:
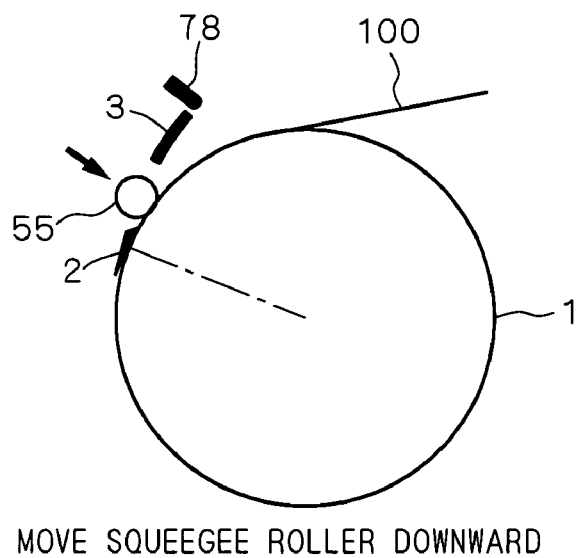
Figure 11F:
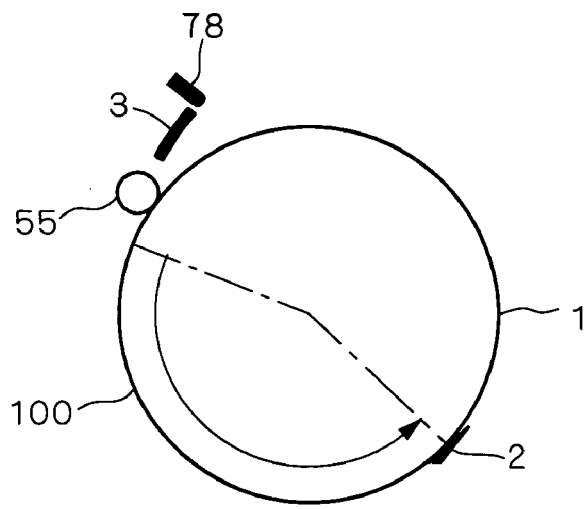
Figure 11G:
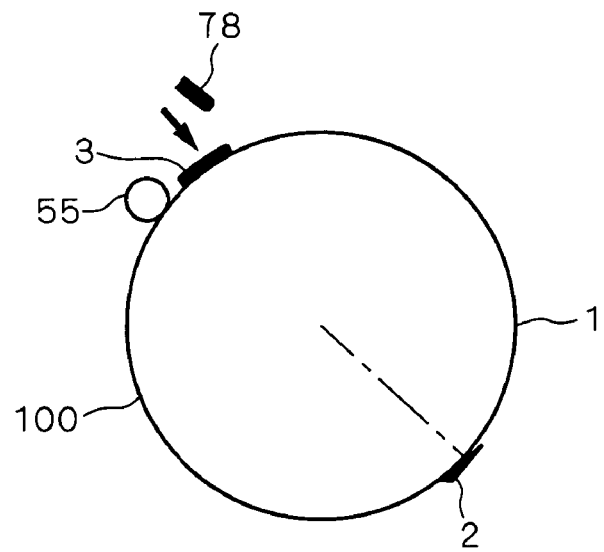
Figure 11H:
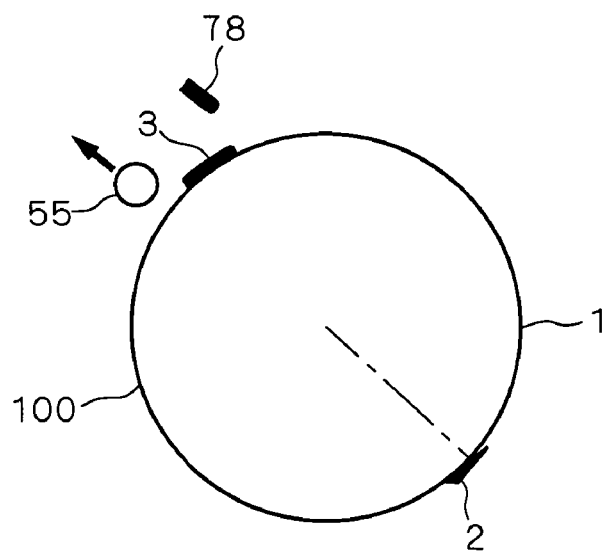

Now consideration will be given to the case in which the guide members 13 are not provided. In this case, a series of additional steps are required. That is, the recording drum 1 is stopped rotating and a brake is applied thereto by the rotation driving device 4 at the time when the leading edge clamp 2 has passed by the squeegee roller 55 (FIG. 11D), and the squeegee roller 55 is then moved toward the recording drum 1 (FIG. 11E). Thereafter, the brake is released to start the rotation of the recording drum 1 again. With such additional steps, the time period required for plate mounting in the comparative example is longer than that in the imaging apparatus of the present embodiment.

Figure 13:
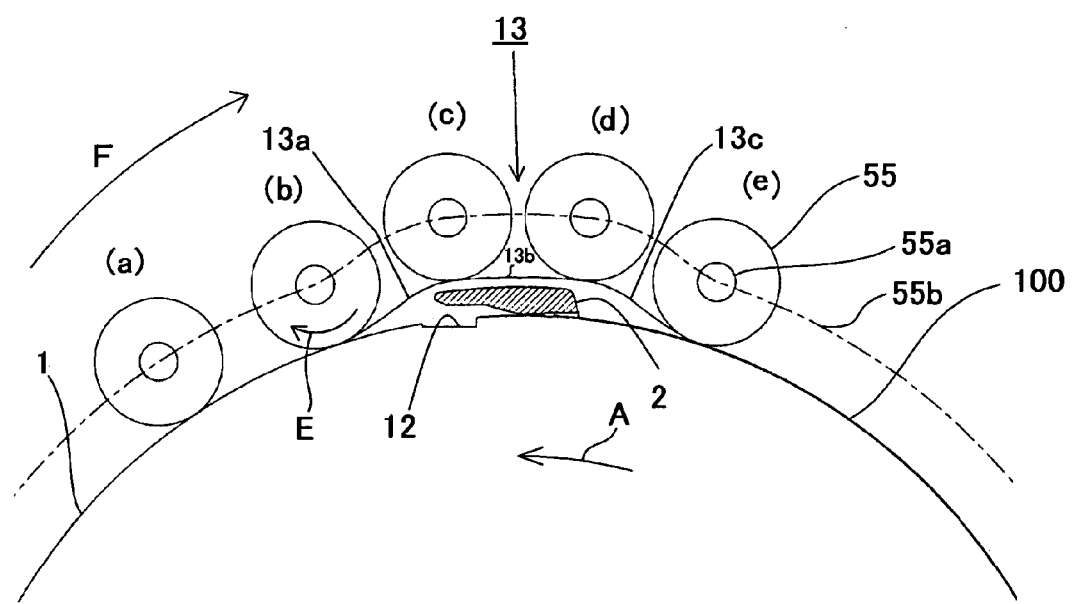
FIG. 13 is an explanatory view illustrating how a squeegee roller relatively moves on a recording drum.

FIG. 13 is an explanatory view illustrating how the squeegee roller 55 climbs up the guide member 13 in the plate mounting operation. The squeegee roller 55 moves along an arrow F on the outer peripheral surface of the recording drum 1 passing through the positions (a) to (e) in this order while rotating along an arrow E with the rotation of the recording drum 1 in the positive direction A. A long and short dashed line 55b in FIG. 13 indicates the trajectory of the center of rotation of the squeegee roller 55.

As described above, the rotary shaft 55a of the squeegee roller 55 is held inside the long hole 64 (see FIG. 4) of each of the swing members 56 while being urged toward the recording drum 1 by the spring 66. This allows the squeegee roller 55 to smoothly move from the position (b) to (c) or position (d) to (e) while keeping a pressure to the recording drum 1.

The shape of the inclined surfaces 13a and 13c of the guide member 13 is decided in view of the circumstances described below such that the squeegee roller 55 does not damage the plate 100.

Since the squeegee roller 55 is rotated following the rotation of the recording drum 1, the rotation speed of the squeegee roller 55 depends upon the distance from the contact portion between the roller 55 and outer peripheral surface of the recording drum 1 to the center of rotation of the recording drum 1. Therefore, the squeegee roller 55 is rotated at a higher speed on the guide members 13 (at the positions (c) and (d) in FIG. 13) than in contact with the outer peripheral surface of the recording drum 1 or plate 100 (at the positions (a), (b) and (e)).

While moving from the position (d) to (e), the rotation speed of the squeegee roller 55 is gradually lowered. With the inclined surface 13c inclined at an appropriate angle, the rotation speed of the squeegee roller 55 is lowered to be substantially equal to the transport speed of the plate 100 at the time when it has reached the position (e). In this case, the plate 100 is not damaged by friction against the squeegee roller 55. However, with the inclined surface 13c inclined at an excessively great angle, the squeegee roller 55 reaches the position (e) with its rotation speed kept still high due to its inertia. In this case, a difference between the rotation speed of the squeegee roller 55 and transport speed of the plate 100 create friction, resulting in damage to the plate 100.

On the other hand, with the inclined surface 13c inclined at an excessively small angle, the squeegee roller 55 presses fewer portions of the plate 100, resulting in another problem in that the plate 100 is in poor contact with the outer peripheral surface of the recording drum 1.

The shape of the guide members 13 is appropriately decided in consideration of the above contradictory circumstances. With the assumption that the inclined surfaces 13a and 13c are truly flat surfaces, respectively, the inventors of the present invention have obtained good results with the guide members 13 formed such that these inclined surfaces 13a and 13c respectively make an angle of approximately 145 degrees with respect to the tangent plane of the recording drum 1.

Referring back to FIGS. 9A to 9F, the rotation of the recording drum 1 in the positive direction A is not temporarily stopped even when the squeegee roller 55 passes over the leading edge clamp 2, but continues until the plate 100 is transported out of the transport unit 9 throughout its full length so that the trailing edge of the plate 100 reaches the outer peripheral surface of the recording drum 1. As described, in the present embodiment, the recording drum 1 is not stopped rotating partway after the leading edge of the plate 100 is clamped by the leading edge clamp 2 until the plate 100 reaches the outer peripheral surface of the recording drum 1 throughout its full length. This allows speedy mounting of the plate 100.

Figure 9E:
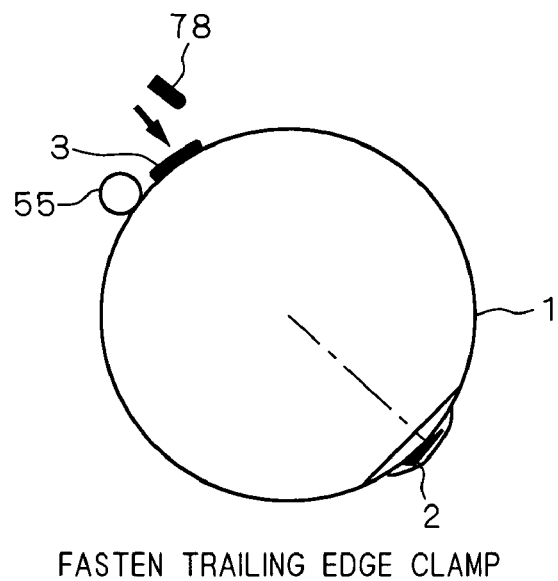

Next, the clamp arms 6 swing, so that the trailing edge clamp 3 held by the holding pin 76 moves to the outer peripheral surface of the recording drum 1. Thereafter, the engaging members are brought into engagement with the clamp grooves 11, allowing the trailing edge clamps 3 to be attached to the outer peripheral surface of the recording drum 1. FIG. 9E shows this stage.

Figure 9F:
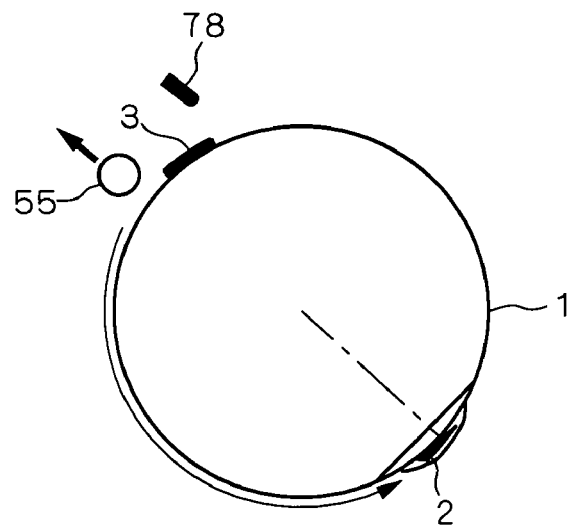

Thereafter, the squeegee roller 55 is moved away from the recording drum 1. FIG. 9F shows this stage.

Accordingly, mounting of the plate 100 to the recording drum 1 is completed, and the recording head 8 starts image recording on the plate 100.

Figure 10A:
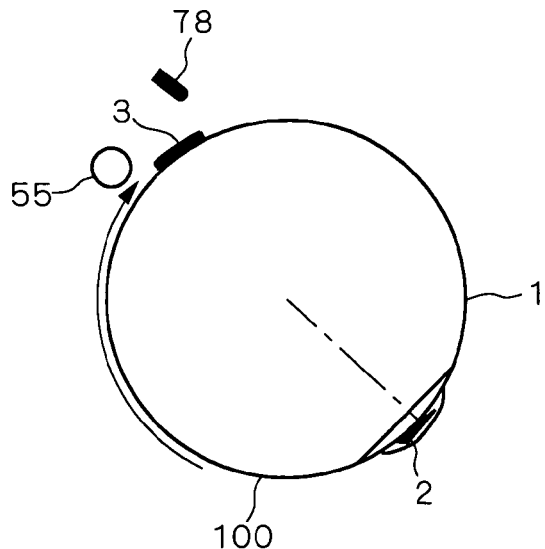
FIGS. 10A to 10F are explanatory views of a plate demounting operation in the imaging apparatus shown in FIG. 1.
Figure 10B:
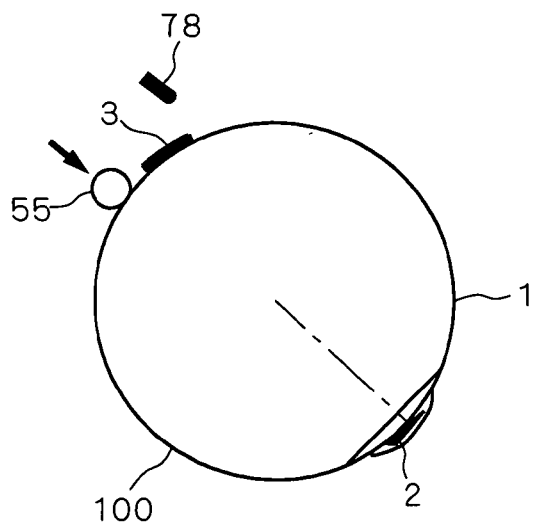
Figure 10C:
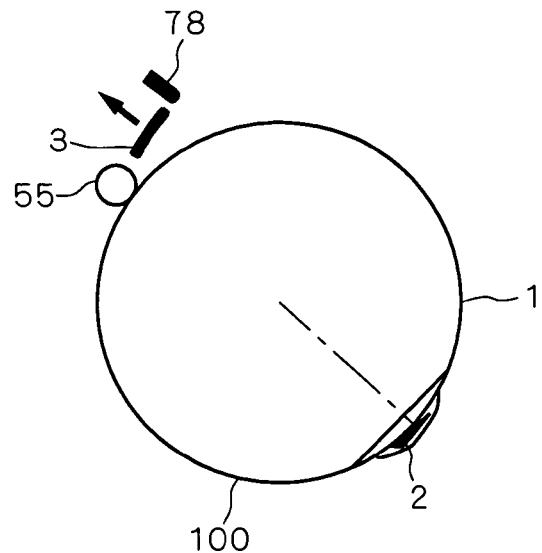

Next, demounting of the plate 100 will be described in reference to FIGS. 10A to 10F. First, the recording drum 1 is rotated until the trailing edge clamp 3 faces the driving bar 60, and a brake is applied thereto by the brake mechanism of the rotation driving device 4 (FIG. 10A). Next, the squeegee roller 55 is moved toward the recording drum 1 (FIG. 10B). Then, the trailing edge clamps 3 are disengaged from the clamp grooves 11 by the driving pin 75, and are held by the driving devices 7 with the holding pins 76. Thereafter, the clamp arms 6 swing in the direction away from the recording drum 1, completing the demounting of the trailing edge clamps 3. FIG. 10C shows this stage.

Figure 10D:
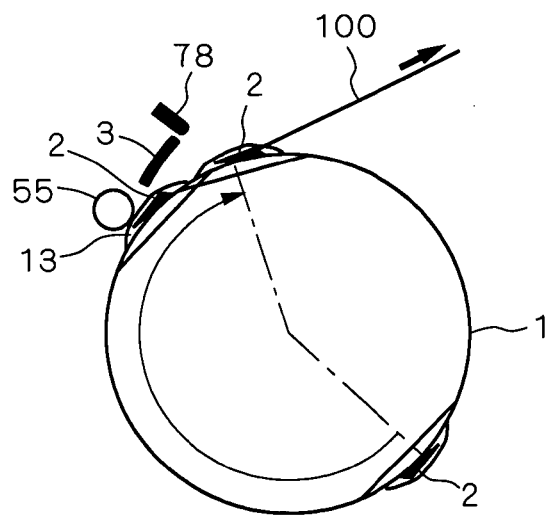
Figure 10E:
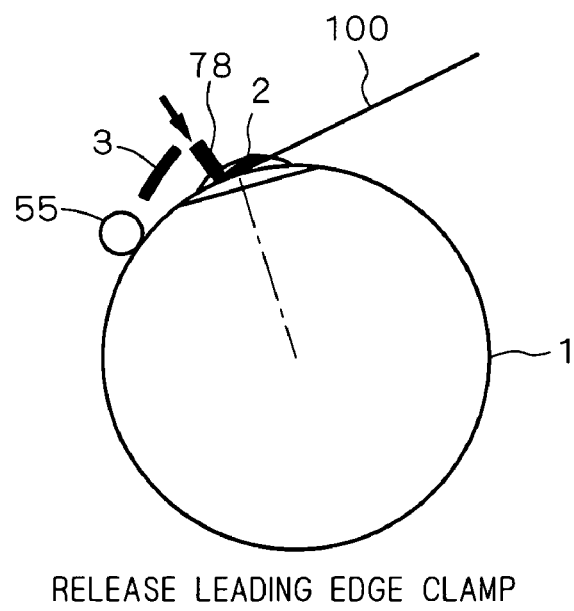
Figure 10F:
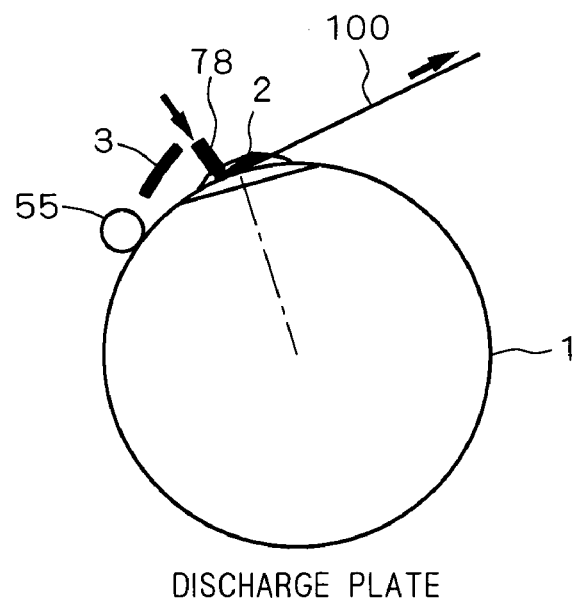

Subsequently, the brake applied by the brake mechanism of the rotation driving device 4 is released to start the rotation of the recording drum 1 in the reverse direction –A. The plate 100 on the recording drum 1 is going to be discharged to the second transport path 92 of the transport unit 9 with the trailing edge in the mounting operation at the head (FIG. 10D). This discharging operation is carried out with the plate 100 being pressed by the squeegee roller 55, so that the tension of the plate 100 can be maintained at an appropriate strength.

The rotation of the recording drum 1 is carried out without interruption until the leading edge clamp 2 faces the release pin 78. During the rotation, the squeegee roller 55 climbs up on the guide members 13. That is, the squeegee roller 55 climbs up on the inclined surface 13*c* of each of the guide members 13, passes over the passage surface 13*b*, and moves on the inclined surface 13*a* toward the outer peripheral surface of the recording drum 1.

Figure 12A:
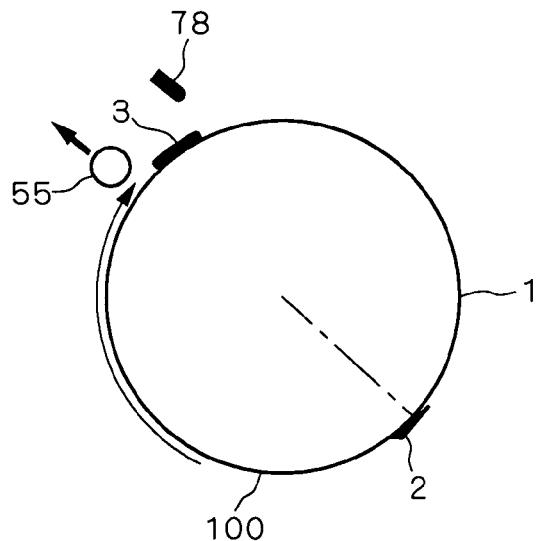
FIGS. 12A to 12H illustrate a comparative example of a plate demounting operation in the absence of guide members, for comparison with that in the preferred embodiment of the present invention.
Figure 12B:
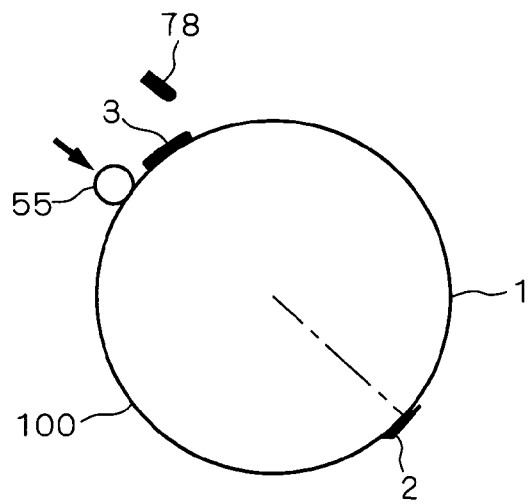
Figure 12C:
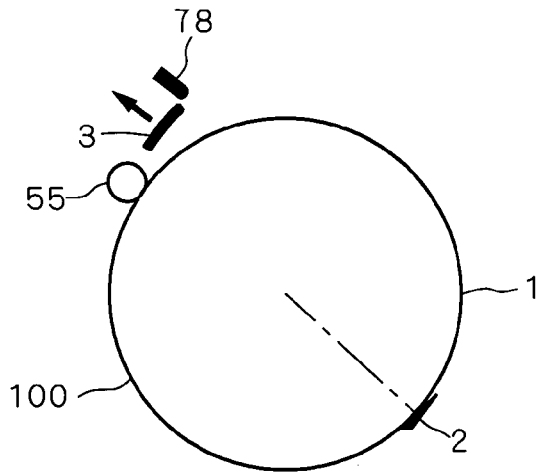
Figure 12D:
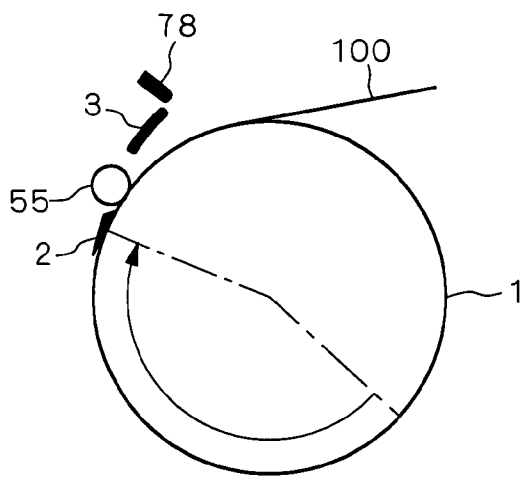
Figure 12E:
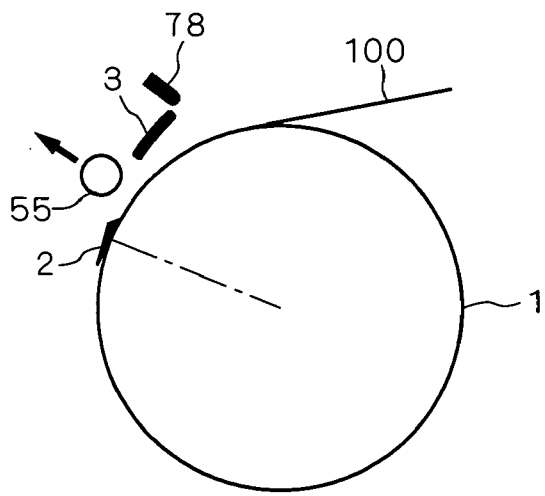
Figure 12F:
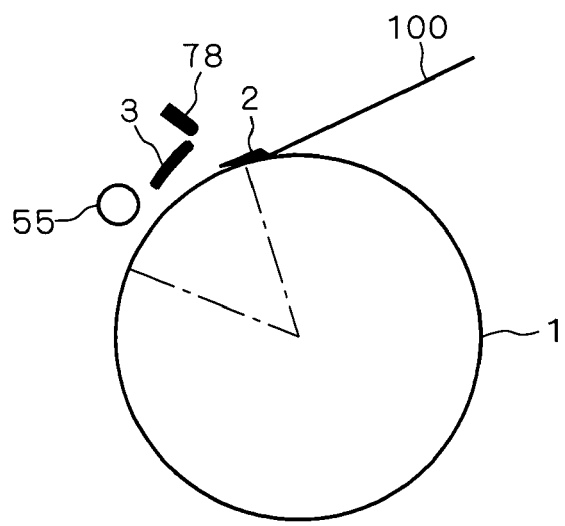
Figure 12G:
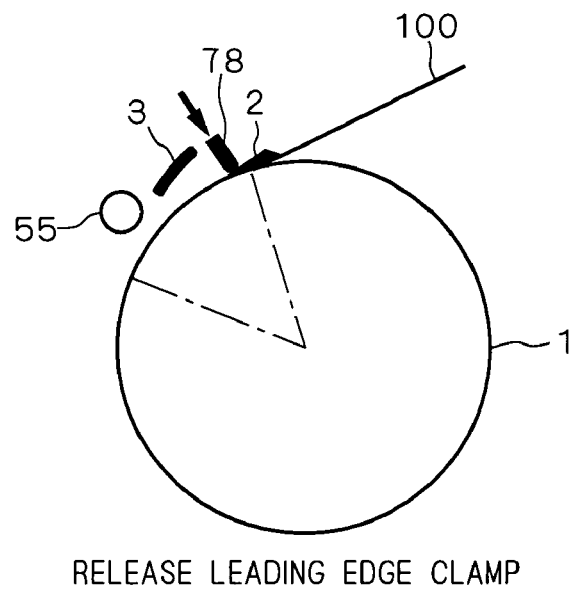
Figure 12H:
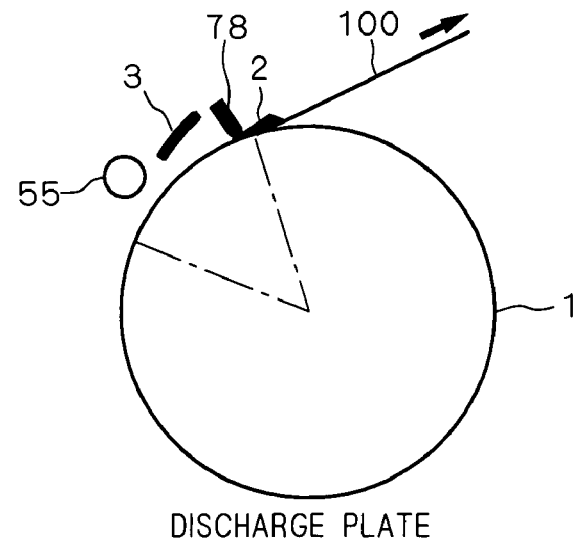

In the case where the guide members 13 are not provided near the leading edge clamps 2, the recording drum 1 is momentarily stopped rotating at the stage where the leading edge clamp 2 is brought close to the squeegee roller 55, and a brake is applied, as shown in the comparative example in FIG. 12D. Next, as shown in FIG. 12E, the squeegee roller 55 is moved away from the recording drum 1. Thereafter, the brake applied to the recording drum 1 is released and the rotation thereof is started again. As described, in the case where members that allow the squeegee roller 55 to pass over the leading edge clamps 2 are not provided, the steps shown in FIGS. 12D and 12E are additionally required. This increases the time period required for discharging the plate 100.

The imaging apparatus according to the present embodiment makes fewer stops of the recording drum 1 during the plate mounting/demounting operations, which can reduce the time period required for plate mounting/demounting operations. Accordingly, the time interval between the completion of image recording on a plate and the start of image recording on a subsequent plate is also reduced. This results in improved availability and productivity of the imaging apparatus (e.g., the number of plates that can be imaged per unit time).

Referring back to FIGS. 10A to 10F, after the recording drum 1 is rotated until the leading edge clamp 2 faces the release pin 78, a brake is applied to the rotation of the recording drum 1 (FIG. 10D), and the leading edge clamp 2 is then released by the release pin 78 (FIG. 10E). Subsequently, the rest of the plate 100 is transported toward the transport unit 9 by a nip roller not shown but provided on the transport path 92 in the transport unit 9. The demounting of the plate 100 from the recording drum 1 is thereby completed.

In the case where a subsequent unexposed plate 100 is provided on the transport path 91 in the transport unit 9, the mounting operation of that plate 100 is started immediately.

A series of operations for a plate performed by the above-described imaging apparatus mainly includes a mounting step of mounting a plate on the surface of a recording drum while rotating, an image recording step of irradiating laser light onto the plate mounted on the drum and a demounting step of demounting the plate from the surface of the rotating recording drum while rotating. The present invention achieves the effect of reducing time periods required for the mounting step and demounting step among these steps. By actual measurements of the time periods required for the mounting step and demounting step in the imaging apparatus described in this preferred embodiment under normal conditions for image recording, it has been found out that the time periods for mounting a plate and for demounting a plate are each reduced by 2 seconds. That is, the series of operations per plate can be reduced by 4 seconds in total. Evaluating this results on the basis of the number of plates that can be processed, the number of plates that can be processed per hour in one imaging apparatus increases approximately by one. This is a particular temporal and economical advantage under recent circumstances where improved processing efficiency is a major challenge in the technical field to which the present invention pertains. Further, by incorporating guide members (components such as cams) in a conventional imaging apparatus as well as changing software for controlling apparatus operations, the present invention can be achieved with relatively low costs, and the above advantage can be obtained.

<Variant>

In the imaging apparatus according to the above-described embodiment, the trailing edge clamps 3 are removably attached to the recording drum 1 such that plates 100 of various sizes can be mounted on the recording drum 1. However, the trailing edge clamps 3 may not necessarily be removably provided in an imaging apparatus if it is not intended for various sizes of plates. The present invention is applicable to this case as well.

Further, in the imaging apparatus according to the above-described embodiment, the transport paths for supplying and discharging the plate 100 to and from the recording drum 1 are arranged vertically with each other and located above the recording drum 1. This requires the recording drum 1 to be rotated in different directions at supply and discharge of the plate 100. However, the recording drum 1 may not necessarily be rotatable both in the positive and negative directions in the case where the transport paths for supplying and discharging a plate are not arranged vertically with each other but located on different positions from each other. The present invention is applicable to this case as well.

Although the guide members 13 are provided to change the traveling path of the squeegee roller 55 in the above described embodiment, guide members may be provided for changing the traveling path of another member different from the squeegee roller 55. For instance, in an imaging apparatus provided with a cleaning roller as a unit roller for cleaning the outer periphery of the recording drum 1 or plate 100, guide members may be provided for causing such cleaning roller to pass over the leading edge clamps 2 and/or trailing edge clamps 3. The present invention is applicable to this case as well.

In the case where structures other than the leading edge clamps 2 and trailing edge clamps 3 are formed on the outer peripheral surface of the recording drum 1, guide members may be provided on the recording drum 1 so that such structures are not interfered. The present invention is applicable to this case as well.

Further, the guide members 13 are arranged one each near the opposite end faces of the recording drum 1 in the above-described embodiment, however, the number of guide members may be increased in the case where the recording drum 1 is longer in its axial direction.

Although only one plate 100 is mounted on the outer peripheral surface of the recording drum 1 in the above-described embodiment, the present invention is also applicable to the case where a plurality of plates are mounted on the recording drum 1 in its circumferential and/or axial direction.

In the above-described preferred embodiment, the leading edge clamps and trailing edge clamps are formed as a plurality of parts, however, they may be formed in a unit to carry out the same function.

While the invention has been shown and described in detail, the foregoing description is in all aspects illustrative and not restrictive. It is therefore understood that numerous modifications and variations can be devised without departing from the scope of the invention.

What is claimed is:

1. An imaging apparatus for exposing a recording material to light, comprising:
   a recording drum having a cylindrical outer peripheral surface on which said recording material is mounted and rotating about a rotary axis thereof in a positive direction and a reverse direction;
   a first transport mechanism for transporting said recording material to said recording drum;
   a second transport mechanism for transporting said recording material from said recording drum;
   a leading edge clamp having a clamp body urged to be fastened;
   a releasing mechanism for pressing said leading edge damp to release said clamp body;
   a trailing edge clamp for clamping the other edge of said recording material to said outer peripheral surface of said recording drum;
   a mounting/demounting mechanism for mounting/demounting said trailing edge clamp from said recording drum;
   a swing member for swinging said releasing mechanism and said mounting/demounting mechanism in directions close to and away from said outer peripheral surface of said recording drum;
   a roller held slidably on said swing member, provided downstream from said releasing mechanism and upstream from said mounting/demounting mechanism with respect to said positive direction of rotation of said recording drum, and urged toward said outer peripheral surface of said recording drum; and
   a guide member provided in the vicinity of said leading edge clamp for causing said roller to climb up thereon to change a traveling path of said roller such that said roller avoids interference with said leading edge clamp, wherein
   when mounting said recording material on said outer peripheral surface of said recording drum,
   said recording drum is rotated until said leading edge clamp faces said releasing mechanism,
   said releasing mechanism releases said clamp body of said leading edge clamp,
   said first transport mechanism transports said recording material toward said recording drum,
   said recording drum is rotated in said positive direction without making a stop with said recording material pressed by said roller, after a leading edge of said recording material is clamped by said clamp body and said recording material mounted on said outer peripheral surface is pressed by said roller, and until said recording material reaches said outer peripheral surface throughout substantially full length thereof, and
   when demounting said recording material from said outer peripheral surface of said recording drum,
   said recording drum is rotated until said trailing edge clamp faces said mounting/demounting mechanism,
   said mounting/demounting mechanism disengages said trailing edge clamp from said recording drum, and
   said recording drum is rotated without making a stop in said reverse direction until said leading edge clamp faces said releasing mechanism with said recording material pressed by said roller to cause said recording material to be discharged to said second transport path.

2. An imaging method comprising the steps of:
a) mounting a sheet-like recording material on a recording drum with part of said recording material pressed by a roller against an outer peripheral surface of said recording drum while rotating;
b) irradiating light onto said recording material; and
c) demounting said recording material from said recording drum with part of said recording material pressed by said roller against said outer peripheral surface of said recording drum while rotating, wherein
said steps a) and c) each include the step of
d) causing said roller to climb up on a guide member provided in the vicinity of a structure formed on said outer peripheral surface of said recording drum such that said roller avoids interference with said structure,
said step a) further includes the steps of:
a-1) transporting said recording material to said recording drum;
a-2) clamping one edge of said recording material to said outer peripheral surface of said recording drum; and
a-3) continuing the rotation of said recording drum alone in a positive direction with said recording material pressed by said roller until said recording material is mounted on said outer peripheral surface of said recording drum throughout substantially full length thereof, and said step c) further includes the steps of:
- c-1) releasing the other edge of said recording material from said outer peripheral surface of said recording drum; and
- c-2) rotating said recording drum in a reverse direction with said recording material pressed by said roller, thereby discharging said recording material.

3. The imaging method according to claim 2, wherein said structure is a clamp member for clamping one edge of said recording material to said outer peripheral surface of said recording drum.

4. The imaging method according to claim 3, wherein said roller is urged toward said outer peripheral surface of said recording drum.

5. The imaging method according to claim 4, wherein said step d) includes the steps of:
- d-1) causing said roller to climb up on said guide member away from said outer peripheral surface of said recording drum;
- d-2) causing said roller to pass over said clamp member; and
- d-3) moving said roller close to said outer peripheral surface of said recording drum.

6. The imaging method according to claim 5, wherein said roller rotates following the rotation of said recording drum in said steps a) and c).

7. The imaging apparatus according to claim 1, further comprising:
- a recording head for recording images on said recording material mounted on said outer peripheral surface.

8. The imaging apparatus according to claim 7, wherein said guide member includes:
- a first inclined surface for causing said roller to climb up thereon away from said outer peripheral surface of said recording drum;
- a passage surface for causing said roller to pass over said leading edge clamp; and
- a second inclined surface for causing said roller to move thereon close to said outer peripheral surface of said recording drum.

9. The imaging apparatus according to claim 8, wherein said guide member is a pair of guide members respectively provided on opposite sides of said clamp member along said rotary axis of said recording drum, and
a length of said roller along said rotary axis is equal to or greater than a space between said pair of guide members.

10. The imaging apparatus according to claim 9, wherein said passage surface is of a height above said outer peripheral surface of said recording drum greater than a height of said leading edge clamp.

11. The imaging apparatus according to claim 10, wherein said roller rotates following the rotation of said recording drum.

12. The imaging apparatus according to claim 11, wherein when said recording drum rotates in said reverse direction, said second inclined surface functions as an inclined surface for causing said roller to climb up thereon away from said outer peripheral surface of said recording drum, and said first inclined surface functions as an inclined surface for causing said roller to move thereon close to said outer peripheral surface of said recording drum.

\* \* \* \* \*